United States Patent Office 2,821,500
Patented Jan. 28, 1958

2,821,500

COATED DUSTLESS, GRANULAR INSECTICIDE FOR FLIES, THEIR LARVAE, AND OTHER INSECTS

Julian H. Jackson and Herman S. Mayeux, Jacksonville, and William J. Head, Lake Jem, Fla., assignors to Wilson & Toomer Fertilizer Co., Jacksonville, Fla., a corporation of Florida No Drawing. Application September 6, 1956
Serial No. 608,219

20 Claims. (Cl. 167—42)

This invention relates to an insecticidal composition in a free-flowing, granular form, which composition is particularly effective against flies, especially house flies (*Musca domestica* L.), in the adult and larval stages, soldier fly larvae (*Hermetia illucens* L.), and also adults and larvae of certain other fly species. It is also effective in killing other insects, such as cockroaches and ants. It is readily pourable from boxes, bags or other containers of similar structure; it can be shaken from containers with perforated tops. Another advantage is that it can be readily applied by hand or mechanically. Nevertheless, it exhibits relative freedom from dust formation either in pouring or shaking it from containers or on scattering it by hand upon surfaces. It is both relatively free of loose, unattached pulverulent particles and substantially free from clumping. However, when compounded with care in the selection of the toxicant chemicals the insecticidal composition exhibits a relative low-level of toxicity to human beings and other warm blooded animals. Because of various of the above properties, it is particularly adaptable for marketing in packages, in ready-for-use form.

Insecticides for fly control are applied in those areas where flies tend to congregate and/or breed, such as dairy barns and other livestock barns and pens, poultry houses, manure piles, garbage dumps, the vicinity of garbage cans, and also on the grounds contiguous to buildings or the porches of residences and in similar areas.

The usual or customary types of insecticides for housefly control are intended for sprays and baits, and are usually liquid in nature. A disadvantage of the former is that the application of sprays to infested areas is laborious and requires the use of some type of mechanical sprayer equipment. Many fly bait preparations come to the user in liquid or dry form to be mixed with water or a similar liquid by the user prior to application. They are applied in such modes as: in separate containers, on absorptive material such as burlap, or on the floor, walls or ground often by means of a sprayer or sprinkler can. Furthermore, such baits are generally designed for use against the fly in adult stage, rather than against both the larval and adult stages.

The granular insecticide of the present invention is not to be confused with a dry pulverulent powder which is the type of pest control composition which is conventionally applied as a dust or spray. In contrast, our granular insecticide is relatively free of unattached pulverulent particles. The physical nature of the product of the present invention permits it to be easily applied by hand and the particles composing it are much easier to direct to the focal area, even though there are air currents, than a powdered product would be under the same atmospheric conditions; then too, more of the product of the present invention comes to rest upon the selected focal area and not upon other surfaces where an application of the insecticide is undesired, since it is not carried away by the wind.

The insecticidal composition which we have invented acts instantly or rapidly, i. e., within a few minutes to kill either the adult house fly only or the house fly in both the adult and larval stages, and its lethal effectiveness lasts for several days in areas sheltered from rains. A good portion of it stays on the surface after application to the focal area, whereby flies can get at the insecticide. Our insecticidal composition permits a much lower concentration of the toxicant contained therein to be used to do a more effective job in killing house flies in the adult and larval stages than is possible when using the same toxicant and attractant on granular fuller's earth or other absorbents under identical conditions.

The present invention is a continuation-in-part of patent applications of the same inventors identified as Serial Numbers 408,034, filed February 3, 1954, and 455,072, filed September 9, 1954, but now abandoned. The prior published art admitted and discussed in the aforesaid patent applications was an article by Jas. B. Gahan and W. C. McDuffe appearing in "Agriculture and Food Chemistry," vol. 28, page 425, issue of April 14, 1954; the Baker Patent #1,450,128, issued May 27, 1923; other U. S. patents, namely #1,733,958, #2,268,108, and #2,547,822. In like manner, each is herewith again acknowledged.

The granular insecticide of the present invention is characterized by inorganic, water-insoluble, non-porous granules, preferably oyster shell or other calcareous shell of particle size range from 3 to 100 screen mesh, inclusive, coated with an oil and an oil-dispersible, organic toxicant for the insect and an organic attractant for the insect. A concentrated aqueous solution of sorbitol can also be used as the coating liquid, to which there has been added preferably thickening agents. The insecticide is free-flowing, but is not dusty when poured or when scattered by hand onto a solid surface. The amount of oil or solution of sorbitol should be sufficient to thoroughly coat the granules, yet without excessive wetting to the condition or point of excessive stickiness or lumping of particles. The coated granular insecticide is substantially free of loose, unattached pulverulent particles. The inorganic, water-insoluble, non-porous granular material should constitute at least substantially two-thirds by weight of the solid carrier; it is preferred for this type material to comprise all of the solid carrier; and a solid granular carrier formed wholly of oyster shell is best of all. The non-porous, inorganic, water-insoluble granules further constitute the major component by weight in the finished granular insecticide, and as is to be perceived from the examples herein its weight exceeds that of the other components in the finished insecticide. The pulverized particles which are present, whether powdered sugar or other organic attractant for the insect, or incidental amounts of finely divided particles present in the solid carrier material or from whatever source are caused to stick or be physically strongly bound to the granules due to the coating media. This is true as to dispersant and other optional constituents in formulating the granular insecticide.

There may be, and preferably is, included in the granular insecticidal composition of the instant invention, a dispersant for the organic toxicant when the latter is not appreciably water-soluble, in order to scatter it into and through the moisture that comes in contact with the granules of solid insecticidal material.

A dye of any desirable color, such as red, may be added and incorporated in the granular insecticidal composition. Its use is quite optional.

Another alternative material which may be incorporated is a stabilizer. The role of such a component is to reduce the speed of breakdown of the organic toxicant. It has been found that weak acids, either inorganic or organic, or other acidic reacting compounds such as salts will reduce the speed of breakdown of "Malathion" where alkalinity is present in the surface materials to which the granular insecticidal material is applied. Hence, boric acid and other weak acids such as citric or tartaric, or acidic reacting components can be incorporated, provided their presence does in no way hinder the general performance of the finished insecticidal composition.

The preferred inorganic, non-porous, water-insoluble granular material we use is oyster shell, which is in a clean (free from debris), dry, ground condition, and particularly ground oyster shell having two particular size ranges within the overall range stated herein after.

Other calcareous shell can be used satisfactorily. By "shell" is meant the exo-skeletons of zoological animals belonging to the phylum Molusca, class Lamellibranchia or Pelecypoda (also known as bivalvia, which includes such animals as oysters, clams, mussels, scallops, etc.). This class is distinguished by having the body bilaterally symmetrical, compressed and more or less completely enclosed within the mantle, which secretes a bivalved shell whose right and left parts are connected by a hinge, over the animal's back. There is no distinct head, and there are usually two lamelliform gills on each side of the body. The term "shell" in our invention is intended to include both processed and unprocessed form, the former meaning broken up and sized, with or without prewashing or other steps.

Other specific non-porous, water-insoluble inorganic substances which may be used in granular form as carriers are sand and quartz (forms of silica) and granite. However, calcareous shell is a better carrier than any of these substances, and superior to all of the aforesaid non-porous substances is oyster shell.

We have successfully used for fly control granules of these aforesaid carrier substances whose particle sizes range between one-quarter inch, i. e., 3 screen mesh, and 100 screen mesh, Tyler Screen Series (Tyler Standard Screen Scale Sieves of W. S. Tyler Company of Cleveland, Ohio). If the particle size is larger than screen mesh 3, then at reasonable quantitative rates of application of shell, i. e., shell weight/surface area in square feet treated, the number of solid particles deposited per square foot is so low as to reduce the lethal effectiveness of the application. In the present invention, the term "granular" is understood to mean the carrier material of particle sizes which will pass through screens ranging from one-fourth inch, i. e., substantially mesh size 3 as the largest size, to 100 screen mesh as the smallest size, inclusive (Tyler Standard Screen Scale Series of the W. S. Tyler Company). It is recognized that as a fact there usually is a fraction of a percent to a few percent of particles, based upon the total weight of shell, whose particles are smaller in size than screen mesh 100.

For adult fly control we have found that solid particles of range 10 to 20 screen mesh are most desirable. For the larvae or maggots we have found that solid particles of range 20 to 40 screen mesh are most desirable. For the combined control of both larvae and adult flies, we prefer a mixture of particles having eighty percent (80%) of particles ranging from 10 to 20 screen mesh and twenty percent (20%) of solid particles ranging from 20 to 40 screen mesh. However, for the combined control of both adult flies and larvae, a mixture of particles having eighty percent (80%) of the particles ranging from 10 to 20 mesh and twenty percent (20%) of the solid particles ranging from 60 to 100 screen mesh may be used. Furthermore, a mixture containing eighty percent (80%) of solid particles ranging from 3 to 20 screen mesh and twenty percent from 20 to 100 screen mesh may be used. In manufacturing it is often desirable to obtain a screening cut of particles ranging approximately 85% from 10 to 20 screen mesh, 10% from 20 to 30 screen mesh and approximately 5% of smaller screen mesh sizes. The fine particles add appreciably to the number of particles deposited per square inch of surface to which the insecticidal composition is applied, and result in better distribution of the toxicant; in this way more of the larvae come in contact with the toxicant. The disadvantage of particles finer than 100 screen mesh and even particles smaller than 40 mesh is that the product made therefrom is likely to be dusty, and dustiness is not desirable. There usually is a very minor, incidental amount of powder in the granular, inorganic solid material of size range one-quarter inch—100 screen mesh.

Oyster shell or other calcareous shell can be admixed with sand, quartz, or granite or other inorganic, non-porous, water-insoluble granules. It is preferred for the carrier to be as nearly wholly shell as possible, there being some extraneous materials such as sand or other solid in shell or associated with it in a natural condition or in the processed state. Likewise a mixture or combination of any two or more of other said non-porous granules may be used if oyster shell or other calcareous shell is not employed as the carrier. It will be understood that it is yet within the spirit of this invention for such inorganic, non-porous granular material to be replaced in part by organic, non-porous granular substances, of which broken or unbroken rice grains would be an example, and wherein this type inorganic granular mtaerial is the dominant portion of the entire carrier, being not less than substantially two-thirds thereof in weight. It will further be understood that the addition or substitution of a few percent by weight, based upon the total carrier, of porous granular substances such as, for example, fuller's earth or bentonite or silica gel or tobacco stems, may be used but the addition of porous type granular substances is not desirable because of their absorbency. Very minor amounts of powder from any of the aforesaid sources may be present, usually incidental in the grinding or screening to prepare the granules.

Shell has certain advantages in the type of insecticidal compositions having a granular base. It is easily converted into the range of particle size desired. It has a density great enough (substantially 2.54 sp. gr. for oyster shell) to resist interference by the wind in the act of being distributed by hand or mechanically, and is sufficiently heavy to remain on the surface of application and not be readily blown away later. It is not as dense as sand (substantially 2.54 sp. gr. for oyster shell vs. 2.64 for sand), nor as light as expanded mica, cut tobacco stems, citrus pulp meal or sawdust. The granules of shell are predominantly flat, which is another reason they are not easily blown by the wind after they come to rest on a surface. As a result of the flattened shape, there is more surface area exposed to the insect than exists in the same weight of granite, sand or quartz of the same mesh size range. The bulk density of shell is much greater, the comparison being on the same screen mesh size, than for granite, sand or quartz (for a sand screening 20–30 mesh found 1.47 as against 0.96 for oyster shell of same range screen mesh). Shell possesses low porosity; therefore the toxicant and other ingredients are adsorbed on the surface but are not absorbed in the solid. The light color of shell is an advantage to the user because he can perceive the coverage or distribution upon a treated surface. Shell, unlike fuller's earth, bentonite, and expanded mica, is not slippery underfoot when wet by water but increases traction. This is important on smooth, hard surfaces such as concrete floors.

As explained previously, there are various kinds of processed shell, including oyster, clam, mussel and scallops. There is also a mixture of shell sold as "reef shells." The term refers to shell coming from an area that is a reef topographically and is a natural mixture of several kinds of shell in widely varying ratios, such as oyster, clam, scallop, conch, etc. We prefer to use oyster shells which are in a clean (free of debris), dry, ground condition, and especially shell having two particle size ranges.

Various non-volatile oils have been employed as coating liquids and found to be suitable. We prefer non-drying oils of the mineral type or glyceride type, or semi-drying oils next in this coating liquid selection. Any non-drying or semi-drying vegetable, animal or marine oil or mineral oil may be used, provided the oil is attractive to or at least not appreciably repellant to the insects, and further provided the oil will serve its major purposes: to carry the toxicant in true or colloidal solution or dispersion, to cause the various ingredients to stick to the granules of the solid carrier material. Examples of suitable vegetable oils are peanut, cottonseed and olive oils. Bland mineral oils, which are refined mineral oils, are suitable. The bland mineral oils are used rather than those with an undesirable odor. Marine oils, unless very highly refined, are usually offensive to human beings. Whereas the non-volatile oil selected may itself possess certain incidental attractive properties for flies or other insects, it is not classed as an attractant for insects, but the coating liquid. When the insecticidal composition is also to be employed against larvae as well as adult flies, the oil which is selected must be capable of being dispersed along with the toxicant by the dispersant.

When a non-volatile oil is employed as the coating liquid the insect toxicant should be dispersible or miscible in the oil. By this is meant a true solution, a colloidal solution or dispersion. There are various organic type toxicants which are oil-soluble or dispersible in oil and have been found to be lethal toward flies and/or their larvae. The toxicant employed should not impart an odor to the finished insecticidal composition which is offensive to humans, or more than very mildly offensive—a factor in commercial acceptance of the insecticide. We prefer to use O,O-dimethyl dithiophosphate of diethyl mercaptosuccinate which is also known under the coined name "Malathion" or "Malathon." The concentration of this substance which we have found works best is one percent (1%) by weight of the total composition, i. e. the granular insecticide, when the particle size range is predominately 10 to 20 screen mesh. For particle sizes ranging predominately from 20 to 40 mesh, it is desirable to increase the Malathion to two percent (2%) concentration or even higher, because of the increased surface to be coated. Malathion is a heavy liquid. It is preferred to select the technical grade of at least 95% purity because we have observed that such purified material does not impart an odor offensive to human beings to the granular bait, whereas technical "Malathion" of less than 95% purity sometimes emits a faint but offensive odor to the finished granular bait.

Another very lethal organic toxicant which is effective against adult flies and even superior to Malathion against fly larvae is "Diazinon." It is used in concentrations of the order that Malathion is employed. "Diazinon" is the trademark designation employed by Geigy Chemical Corporation, and is understood to be O,O-diethyl-O-(2-isopropyl-4-methyl-pyrimidyl (6)) thiophosphate.

O,O - dimethyl - 1 - hydroxy - 2,2,2 trichloroethylphosphonate. It is also known as O,O-dimethyl-2,2,2 trichloro-1-hydroxyethyl phosphonate; the product is sold under the trademark "Dipterex" (a product of Chemagro Corporation of New York city); it is a toxicant of the water-miscible type. It is lethal both to adult house flies and fly larvae.

"Lindane" is another oil-dispersible insect toxicant, effective against adult house flies. Chemically it is essentially the pure gamma isomer of benzene hexachloride. The technical grade with gamma isomer content of over 99% is preferred.

"Dilan" which is composed of a mixture of 2-nitro-1,1-bis (p-chlorophenyl) propane and 2-nitro - 1,1 - bis (p-chlorophenyl) butane, and which is oil-soluble can be used as the toxicant, since it is lethal toward flies. Neither "Lindane" nor "Dilan" is as effective against house flies as the first three mentioned.

Other toxicants which are oil-soluble or oil-dispersible and possess in low concentrations lethal action toward house flies and other flies and/or other insects and their larvae, yet which possess low toxicity toward warm blooded animals may be used. The order of toxicity toward flies and other insects will vary and the specificity as to the various kinds of insects; this will affect the choice of toxicant. The concentration of the toxicant will vary with its lethal effect in respect to the insect host. In general, the lower range is 0.1% and the highest range 10% by weight of the granular insecticide.

The quantity of oil or concentrated aqueous solution of sorbitol to be used should be sufficient to thoroughly coat the granules of the carrier and the other dry components in the granular insecticide yet without excessive wetting to the condition or point of excessive stickiness or lumping of the particles. The quantity of oil in reference to a given weight of granular carrier will depend upon the nature thereof in sizes of particles and to some extent upon the kind of material being coated. In reference to all the dry material, and to state this in another way, the amount of oil or concentrated aqueous solution of sorbitol depends upon the phenomena of adsorption or absorption, the factors in which are the amount of surface area to be coated and the degree of porosity of the particles. From the subsequently presented examples, it will be seen in Examples 1 and 2 that 3.1% has been found to be ample for oil for granular oyster shell of coarse and fine sizes, and 2.5% when using only the coarse size. If there is too little oil or sorbitol the finished product will lack maximum attractiveness to the insects and may tend toward dustiness. The undesirable aspect of dustiness has been previously mentioned.

If the organic, insect toxicant is not soluble in water appreciably or is present as a dispersion in oil, it is advantageous to employ a dispersant for it; this is more particularly true when the granular insecticide is to be used to kill the fly larvae, or any other insect larvae.

The role of the dispersant is to scatter the toxicant-oil solution into and throughout the moisture that comes in contact with the granules of solid insecticidal material; this can be viewed as an emulsifying action when the dispersant is the emulsifying or penetrating agent. One which we have used in many formulations is a high purity sodium naphthalene sulfonate known as "Petronate" (marketed by L. Sonnenborn & Sons, Inc., of Chicago, Illinois). This is representative of the organic sulfonic acid type. And the sodium acid sulfate of a higher alcohol type compound would function in an analogous way, such as sodium lauryl sulfate, but are more costly.

Another dispersant, but entirely different chemically, is "Maypon," a material condensation proteinaceous material obtained from chrome leather oils (product of Maywood Chemical Works of Maywood, New Jersey). However, other compounds or mixtures that are miscible and compatible with the other liquid ingredients and can disperse the toxicant-oil in water, yet are not objectionable to the adult insects, can be employed.

Previous mention has been made of the quite optional use of a dye. The dye which we prefer to use is known as Du Pont Woodstain Scarlet. A dye serves several purposes, to wit: acts as a color indicator to the manufacturer in determining the thoroughness of distribution of the liquid or semi-solid coating material upon the solid particles, confers attractiveness in appearance to the user, facilitates distinguishment of the insecticidal composition from the surfaces upon which it lies and renders the particles more conspicuous to the human eye.

It will be understood that a blend of two or more oils can be employed instead of one oil, and that in the same way a mixture of each of the other essential components can be used and/or dispersant and/or stabilizer and/or dye; the latter three are desirable under certain conditions, more particularly the dispersant.

The attractant for the flies or other insects which we prefer to use is sugar (sucrose), and in the powdered form. Other sugars can be used, including glucose and fructose. Tupelo honey can be used and does not crystallize. The attractant is suspended in the non-drying or semi-drying oil or concentrated aqueous solution of sorbitol. We have observed that the combination of sugar (sucrose) and glyceride type oil from vegetable sources is more attractive to flies and certain other insects than either used separately. Molasses is not as satisfactory owing to a tendency to spoil under warm weather conditions. Powdered milk can be used. Two or more insect attractants may be mixed together and used. Various synthetic organic chemicals have been used in formulations which increase attractiveness to the insects. Such attractants are used with sucrose or other sugars; they have odor of flowers, stables or other odors attractive to flies. Some of these are Fritzsche Brothers, Inc. (Port Authority Bldg., 76 9th Ave., N. Y., N. Y.) Fly Attractants No. 25091 and 25092, and Polak's Frutal Works, Inc., Middletown, N. Y., Fly Attractants Nos. 1, 2 and 3. The percentage of attractant in the finished product may be varied, as well as the choice thereof, as appears necessary to accomplish the desired result, namely the death of flies and/or other insects.

The usual commercial way in which this granular insecticide is made is to mix all the solid components thereof in one mixer. The liquid or semi-solid components are mixed separately and this mixture in turn is added to the mixture of solids, the mass being thoroughly stirred. When "Arlex" is used, a coating liquid containing a very high percentage of sorbitol, subsequently mentioned, we find it is best to mix all the dry solid ingredients except sugar; the liquid mixture is added, and last the sugar in dry form is added, and the mixing operation continued.

By another mode in the manufacture of the product of the present invention, the toxicant, the oil, and the attractant are intimately mixed together with the dispersant, the stabilizer (acid) and dye, if any or all of the latter three ingredients are also to be incorporated. The coating operation which follows this step is best accomplished by mixing, wherein the solid granules are stirred or tumbled while the liquid mixture is being poured upon the granular mass and for a few minutes thereafter. These are not the only ways that the production of the coated solid granules can be achieved. The various modes will depend of course upon choice and/or the components which form the coated granular insecticides, which in other embodiments may not include an oil. Mixing of small amounts may be done by hand by using a suitable paddle and a container such as a bucket. In larger quantity operations, such as would be used commercially, various types of mechanical mixers that are capable of physically mixing the liquid mixture with the solid granules, such as a ribbon-type mixer or a paddle-type mixer of which the pony mixer is one, can be utilized.

As has become apparent from the above disclosure, neither toxicant nor oil nor dispersant nor any of the granular solid materials should reduce the attractiveness of the final product toward flies and other intended hosts perceptibly. Hence, care should be exhibited in the selection of these respective components in determining the formulation.

A commercially available non-crystallizing aqueous polyhydric alcohol solution consisting of sorbitol and anhydrides and other polyhydric derivatives of sorbitol which prevent crystallization of the solution may be used. The product goes by the trademark "Arlex" and is sold by Atlas Powder Company of Wilmington, Delaware. It has but a faint odor, and its viscosity is approximately 1700 cp. @ 25° C. The analysis of its producer states that the polyhydric alcohol content is at least 83.0%. Sorbitol is a hexa-hydric, aliphatic alcohol. Its aqueous solution is classified as a humectant. Instead of "Arlex," other aqueous solutions of sorbitol, one of such being a 76% aqueous solution of sorbitol and its anhydrides, of which polyhydric alcohol content ⅔ is sorbitol (sold by this same company) may be used. These aqueous solutions of sorbitol both act as a coating liquid like the oils and to prevent loss of water or drying out, and clodding or clustering of the finished granular insecticide. From the examples hereinafter it will be perceived that "Arlex" which has a high viscosity, much higher than that of the 76% aqueous solution of sorbitol (approximately 300 cp. @ 25° C.), and a higher polyhydric alcohol content, is more frequently used. The lowest sorbitol content in such coating liquid is to be formed in Example 15 wherein the sorbitol content is one-half that of the water, namely ⅓:⅔. Sorbitol, chemically, is not a hexose, not being aldehyde nor ketone alcohols.

Gum arabic, pectin and gelatin may each be used as a constituent in the coating material. Powdered gum arabic absorbs sorbitol during the first few days and swells somewhat, i. e., after being applied to the granular carrier. Powdered gelatin and pectin do not absorb sorbitol very appreciably, it has been our observation. These three aforesaid substances may also be employed when an oil is chosen as the coating liquid. Example 7 hereinafter sets out a satisfactory method of making the granular insecticide when powdered gum arabic is employed. It is satisfactory when powdered pectin or gelatin is used instead of the gum arabic. When an oil is chosen instead of sorbitol as the coating medium a variation of that method should be utilized. By this, the various solid components are mixed, and in a separate vessel all the liquid components are mixed; and thereafter the mixture of liquids is added to and thoroughly incorporated into the mixture of solids.

Chemically, gum arabic and pectin are not similar to gelatin. Gum arabic, which is an exudate from vegetable plants, is considered to consist of the potassium and calcium salts of arabic acid. Pectin substances, which occur in fruit juices, are closely allied to vegetable gums; the basic constituent is considered to be the calcium or magnesium salt of pectic acid. Gelatin is classified as a protein. They each however confer body to the coating liquid by being suspended in the coating liquid or colloidally dissolved therein; and they help bond the organic attractant and toxicant to the solid carrier.

"Hi Sil" may be used as an agent to confer a body to the coating. "Hi Sil" is the trademark designation for hydrated silica in extremely finely divided form, sold by Columbia-Southern Chemical Corp. of Pittsburgh, a division of Pittsburgh Plate Glass Company of Pittsburgh, Penna.; the particle size range thereof is less than 1 micron. It adsorbs on its surface the liquid components and because of the extreme subdivision is able to hold a great amount of liquid on its surface.

The detailed description has been as to oils as the coating liquid and oil-dispersible or oil-soluble toxicants and also as to concentrated aqueous solutions of sorbitol as the coating liquid. It will be understood that the general principles and the detailed mode of manufacture can be adopted to water-soluble toxicants. It should like to be stated that if the attractant or toxicant has a tendency to crystallize, the finished product where there is a high percentage of either component has a tendency to cake or harden, particularly if let stand on the shelf, etc. If this happens, the hard insecticide product can be broken up, whereupon it can be poured or distributed by hand without further difficulty. It is sometimes helpful, where the container of the granular insecticide has been let stand many weeks, to give it a thump to correct any superficial sticking of coated granules.

Certain advantages of the present invention over sprays and baits for insects, more particularly for house flies and other kinds of flies have been presented, supra. But it has other significant advantages. Our insecticidal composition is formulated so as to be attractive to flies but toxic to them by contact and/or ingestion. Furthermore, it may be so constructed that the active toxicant is able to become separated from the solid inorganic particles which form the major component thereof after application to a surface and pass into whatever moisture is in contact with the solid particles; the result is that the surrounding surface itself, upon which the solid granular insecticidal composition is applied, may become toxic to flies. And furthermore, what is also significant, the active toxicant, so separated from the granules, kills by contact or ingestion the larvae of house flies and certain related species that may be within or beneath the surface to which the insecticidal composition has been applied.

From the examples appended below, it will be seen that Malathion, a very lethal fly toxicant, can be employed with "Arlex," which is a very concentrated aqueous solution of sorbitol as well as with non-volatile oils.

The invention is illustrated but not limited by the following examples:

Example 1

This formula is best suited for use against adult insects only and is not as effective against larvae as those set out in the next four examples, because this formula does not contain a dispersant.

Using coarse oyster shell:

| | |
|---|---|
| 95% technical Malathion | 1.7 oz. |
| Cottonseed oil | 4.0 oz. |
| Powdered sugar (sucrose) | 1 lb. |
| Coarse oyster shell (sizes 10 to 20 screen mesh) | 8 lbs. 9.3 oz. |
| Total | 9 lbs. 15.0 oz. |

In this example peanut oil may be substituted in full or in part for the cottonseed oil.

Example 2

This basic formula is preferred for the combined control of adult flies and fly larvae.

| | |
|---|---|
| "Petronate" | 1.7 oz. |
| Powdered sugar (sucrose) | 1 lb. |
| 95% technical Malathion | 1.7 oz. |
| Peanut oil | 5.0 oz. |
| Coarse oyster shell (size 10 to 20 screen mesh) | 6 lbs. 12.0 oz. |
| Fine oyster shell (size 60 to 100 screen mesh) | 1 lb. 11.6 oz. |
| Total | 10 lbs. |

In this formula, cottonseed oil may be substituted in whole or in part for peanut oil in the same way yet conversely, as explained in the previous example. "Petronate" is a liquid.

Example 3

This formula is identical with that in Example 2 except that a red dye is employed; the amount of fine oyster shell is merely reduced slightly in retaining the over-all weight at 10 lbs.

| | |
|---|---|
| "Petronate" | 1.7 oz. |
| 95% technical Malathion | 1.7 oz. |
| Peanut or cottonseed oil | 5.0 oz. |
| Du Pont Woodstain Scarlet dye | 0.2 oz. |
| Powdered sugar (sucrose) | 1 lb. |
| Coarse oyster shell (size 10 to 20 screen mesh) | 6 lbs. 12.0 oz. |
| Fine oyster shell (size 60 to 100 screen mesh) | 1 lb. 11.4 oz. |
| Total | 10 lbs. |

Example 4

A formula in which boric acid is employed to stabilize the Malathion in the granular insecticide appears in next formula.

| | |
|---|---|
| Technical, powdered boric acid | 1.7 oz. |
| "Petronate" | 1.7 oz. |
| 95% Malathion technical | 1.7 oz. |
| Peanut or cottonseed oil | 5.0 oz. |
| Powdered sugar (sucrose) | 1 lb. |
| Coarse oyster shell (size 10 to 20 screen mesh) | 8 lbs. 5.9 oz. |
| Total | 9 lbs. 15.0 oz. |

In preparing this composition having prolonged lethal effect toward insects, the boric acid is mixed with the shell and sugar before adding the mixture of liquid components to the granules of oyster shell. But the boric acid could be mixed with the liquid mixture before adding the latter to the shell and sugar.

Example 5

| | Percent |
|---|---|
| Water-wettable powder containing 25% Malathion | 4.0 |
| Cottonseed oil | 5.0 |
| Powdered sugar (sucrose) | 10.0 |
| Oyster shell of screen mesh 10–20 | 81.0 |
| Total | 100.0 |

Example 6

| | |
|---|---|
| 95% technical Malathion | 2.0 |
| "Arlex" | 2.0 |
| Powdered sugar (sucrose) | 5.0 |
| Oyster shell of screen mesh 10–40 | 91.0 |
| Total | 100.0 |

Example 7

| | |
|---|---|
| 95% technical Malathion | 1.0 |
| Powdered gum arabic | 1.0 |
| Powdered sugar (sucrose) | 10.0 |
| "Arlex" | 3.0 |
| Oyster shell (10–30 screen mesh) | 85.0 |
| Total | 100.0 |

In the preparation of the granular insecticide by this formula the powdered gum arabic is mixed with the shell, and in a separate vessel the liquids, namely "Arlex" and Malathion are mixed. The liquid mixture is added to the dry solids mix, and stirred well, after which the powdered sugar is added slowly and mixed therein. The gum arabic absorbs the "Arlex" during the first few days and swells somewhat.

Example 8

| | Percent |
|---|---|
| 95% technical Malathion | 1.0 |
| "Arlex" | 3.0 |
| Powdered sugar (sucrose) | 10.0 |
| Oyster shell (10–30 screen mesh) | 57.0 |
| Broken rice grains | 29.0 |
| Total | 100.0 |

Example 9

| | |
|---|---|
| 95% technical Malathion | 1.0 |
| "Arlex" | 3.0 |
| Powdered sugar (sucrose) | 10.0 |
| Oystel shell (10–30 screen mesh) | 86.0 |
| Total | 100.0 |

Example 10

| | |
|---|---|
| 95% technical Malathion | 1.0 |
| "Arlex" | 2.0 |
| Powdered sugar (sucrose) | 10.0 |
| Granite (10-20 screen mesh) | 87.0 |
| Total | 100.0 |

Example 11

| | |
|---|---|
| 95% technical Malathion | 1.0 |
| "Arlex" | 3.0 |
| Powdered sugar (sucrose) | 10.0 |
| Granite (10-20 screen mesh) | 57.0 |
| Broken rice grains | 29.0 |
| Total | 100.0 |

Example 12

| | |
|---|---|
| 95% technical Malathion | 1.00 |
| "Arlex" | 1.75 |
| Powdered sugar (sucrose) | 10.00 |
| Sand (20-30 screen mesh) | 87.25 |
| Total | 100.00 |

Example 13

| | |
|---|---|
| 95% technical Malathion | 1.00 |
| Powdered gum arabic | 1.00 |
| "Arlex" | 1.50 |
| Powdered sugar (sucrose) | 10.00 |
| Sand (20-30 screen mesh) | 86.50 |
| Total | 100.00 |

Example 14

| | |
|---|---|
| 95% technical Malathion | 1.00 |
| "Arlex" | 2.25 |
| Powdered sugar (sucrose) | 10.00 |
| Sand (20-30 screen mesh) | 57.75 |
| Broken rice grains (10-30 screen mesh) | 29.00 |
| Total | 100.00 |

Example 15

In this example a water-soluble insect toxicant dissolved in water containing also sorbitol (a humectant) and an organic attractant for the insects is applied to coat the shell. The granular insecticide is lethal to adult house flies and fly larvae.

| | Percent |
|---|---|
| O,O-dimethyl-1-hydroxy-2,2,2 trichloroethylphosphonate | 1.0 |
| Sorbitol | 2.0 |
| Water | 4.0 |
| Granular sugar | 10.0 |
| Oyster shell of screen mesh 10-20 size | 66.5 |
| Oyster shell of screen mesh 60-100 size | 16.5 |
| Total | 100.0 |

Sorbitol prevents drying out and clodding or clustering of the finished insecticide.

This finished composition, because of the high percentage of sugar, tends to harden upon aging. If and when this occurs the hardened product can be crushed, and thereafter this condition will not reappear. By reducing the percentage of sugar and increasing the amount of sorbitol, this tendency can be counteracted.

Example 16

| | Percent |
|---|---|
| 95% technical Malathion | 1.35 |
| "Petronate" | 1.00 |
| "Arlex" | 2.00 |
| Powdered sugar (sucrose) | 5.00 |
| Oyster shell (10-30 screen mesh) | 90.65 |
| Total | 100.00 |

Example 17

| | |
|---|---|
| 95% technical Malathion | 1.5 |
| "Arlex" | 0.5 |
| Powdered sugar (sucrose) | 5.0 |
| Powdered gelatin | 2.0 |
| Sand (10-30 screen mesh) | 91.0 |
| Total | 100.0 |

Example 18

| | |
|---|---|
| 95% technical Malathion | 1.00 |
| Du Pont Woodstain Scarlet dye | 0.01 |
| Powdered gelatin | 2.00 |
| Mineral oil, bland | 2.50 |
| Powdered sugar (sucrose) | 5.00 |
| Oyster shell (10-30 screen mesh) | 89.49 |
| Total | 100.00 |

Example 19

| | |
|---|---|
| 95% technical Malathion | 1.00 |
| Du Pont Woodstain Scarlet dye | 0.01 |
| Powdered gelatin | 2.00 |
| "Arlex" | 2.50 |
| Powdered sugar (sucrose) | 5.00 |
| Oyster shell (10-30 screen mesh) | 89.49 |
| Total | 100.00 |

Example 20

| | |
|---|---|
| 95% technical Malathion | 1.00 |
| Du Pont Woodstain Scarlet dye | 0.01 |
| Powdered gelatin | 2.00 |
| "Arlex" | 0.75 |
| Powdered sugar (sucrose) | 5.00 |
| Granite (10-20 screen mesh) | 91.24 |
| Total | 100.00 |

Example 21

| | |
|---|---|
| 80% "Diazinon" solution (in xylene) | 1.45 |
| "Petronate" | 1.00 |
| "Arlex" | 2.00 |
| Powdered sugar (sucrose) | 5.00 |
| Oyster shell (10-30 screen mesh) | 90.55 |
| Total | 100.00 |

Example 22

| | |
|---|---|
| 80% "Diazinon" solution (in xylene) | 1.25 |
| "Petronate" | 1.00 |
| Mineral oil, bland | 2.00 |
| Powdered sugar (sucrose) | 10.00 |
| Oyster shell (10-30 screen mesh) | 85.75 |
| Total | 100.00 |

Example 23

| | |
|---|---|
| 95% technical Malathion | 1.0 |
| Powdered pectin | 2.0 |
| "Arlex" | 2.5 |
| Powdered sugar (sucrose) | 5.0 |
| Oyster shell (10-30 screen mesh) | 89.5 |
| Total | 100.0 |

Example 24

| | |
|---|---:|
| 95% technical Malathion | 1.0 |
| Powdered pectin | 2.0 |
| "Arlex" | 1.0 |
| Powdered sugar (sucrose) | 5.0 |
| Granite (10–20 screen mesh) | 91.0 |
| Total | 100.0 |

Example 25

| | |
|---|---:|
| 95% technical Malathion | 1.0 |
| Powdered pectin | 2.0 |
| "Arlex" | 0.75 |
| Powdered sugar (sucrose) | 5.0 |
| Sand (20–30 screen mesh) | 91.25 |
| Total | 100.00 |

Example 26

| | |
|---|---:|
| 95% technical Malathion | 1.0 |
| "Arlex" | 1.0 |
| Tupelo honey | 5.0 |
| Oyster shell (10–20 screen mesh) | 83.0 |
| Oyster shell (60–100 screen mesh) | 10.0 |
| Total | 100.0 |

Example 27

| | |
|---|---:|
| 95% technical Malathion | 1.0 |
| "Arlex" | 1.0 |
| Tupelo honey | 5.0 |
| "Hi Sil" | 2.5 |
| Sand (20–30 screen mesh) | 90.5 |
| Total | 100.0 |

It has been found that as little as one-fourth pound of the final granular insecticide per 100 square feet of surface is usually sufficient to control adult house flies. We have found that it is not necessary to treat all of the infested area because the product has the characteristic of attracting flies in the immediate vicinity to feed upon the bait. Adult flies usually become affected by the poison within two or three minutes after feeding upon this insecticide. In cold weather this time may be as long as 5 to 10 minutes, depending upon the temperature. Death of the flies occurs within a few minutes after the first sign of toxic effects, in most instances. Adult flies have been observed dying as the result of feeding upon particles of this insecticidal compound that were applied on a dry surface seven days earlier. This observation has been repeatedly checked. Ability to cause death to adult flies after seven days shows the prolonged lethal properties of the coated granular insecticide of our invention.

Against the larval stage of the house fly and other fly species, it is necessary to use as much as one or two pounds of the granular insecticide per 100 square feet of surface to the manure or other incubating grounds in which the larvae are feeding. The granules often penetrate into the matrix, particularly if the matrix is itself granular in nature, and especially when larvae are numerous in the matrix. The movement of the larvae aids greatly in mixing the granules into it. The toxicant penetrates into the matrix, the rate depending upon the amount of surface moisture present in the matrix. House fly larvae that are very near the surface usually begin to die within 30 minutes. Larvae die over a period of two to seven days, depending upon the toxicant used, where present in a depth of two or three inches in the matrix, depending upon the penetration of the toxicant and movements of affected individual larvae.

It has been found that the best way in which to apply the insecticidal compound of the present invention is to scatter the granules by hand over the area to be treated. It may be expedient to protect the hand of the individual against the toxicant by some form of glove where the human skin is brought into contact for a prolonged period of time; and, as a further precaution, the hands should be washed after use to avoid any possible toxic effect of the Malathion or other toxicant therein upon the user. It is possible also to distribute it from a shaker top type of container, whereby any contact with the skin would be avoided.

While there are above disclosed but a limited number of embodiments of the granular insecticidal product of the invention herein presented, it is possible to produce still other embodiments without departing from the inventive concept herein disclosed. It is desired, therefore, that only such limitations be imposed on the appended claims as are stated herein.

The term "non-porous" is used in the claims as also embracing the physical characteristic of not being capable of occluding the coating liquid or semi-solid inside the granules. The term "relatively non-drying" to qualify "oil" is understood to include either an oil that is non-drying or semi-drying. The term in the claim "oil solution" or "solution . . . in an oil" is to be construed to embrace a dispersion in addition to a true or colloidal solution. And the designation of particle size by "screen mesh" refers to the Tyler Standard Scale Sieves.

We claim:

1. An insecticidal composition in granular form, characterized by inorganic, non-porous, water-insoluble granules with particle size range from 3 to 100 screen mesh, inclusive, as a carrier coated with an oil solution of an organic toxicant for the insect, and an organic attractant for the insect, which inorganic granules constitute approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable, and is relatively dustless upon being poured from a container and under normal conditions of hand distribution.

2. An insecticidal composition in granular form, characterized by inorganic, non-porous, water-insoluble granules with particle size range from 3 to 100 screen mesh, inclusive, as a carrier coated with an oil solution of an organic toxicant for the insect, and an organic attractant for the insect and a dispersant for the toxicant-oil solution as to moisture that comes in contact with the granules, which inorganic granules constitute approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

3. An insecticidal composition in granular form, suitable for use against flies and other insects, characterized by inorganic, non-porous, water-insoluble granules with particle size range from 3 to 100 screen mesh, inclusive, as a carrier coated with a solution of O,O-dimethyl dithiophosphate of diethyl mercaptosuccinate in an oil, and sugar in small particle size, which inorganic granules constitute approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

4. An insecticidal composition in granular form characterized by granules of particle size ranging from 3 to 100 screen mesh, inclusive, of oyster shell as a carrier coated with a mixture of an oil solution of an organic toxicant for the insect, and an organic attractant for the insect, which granular oyster shell constitutes approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

5. An insecticidal composition in granular form characterized by granules of particle size ranging from 3 to 100 screen mesh, inclusive, of oyster shell as a carrier coated with a mixture of an oil solution of an organic toxicant for the insect, an organic attractant for the insect, and a dispersant for the toxicant-oil solution as to moisture that comes in contact with the granules, which granular oyster shell constitutes approximately the entire solid carrier in the granular insecticide, and which oil is substantially nonvolatile at atmospheric temperatures and relatively non-drying, the granular insecticide being relatively free of loose, unattached pulverulent particles substantially free from clumping and readily pourable and is relatively dustless upon being poured from a container and under normal conditions of hand distribution.

6. An insecticidal composition in granular form, characterized by granules of particle size ranging from 3 to 100 screen mesh, inclusive, of granite as a carrier coated with a mixture of an oil solution of an organic toxicant for the insect and an organic attractant for the insect, which granite constitutes approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

7. An insecticidal composition in granular form, characterized by granules of particle size ranging from 3 to 100 screen mesh, inclusive, of granite as a carrier coated with a mixture of an oil solution of an organic toxicant for the insect, an organic attractant for the insect, and a dispersant for the toxicant-oil solution as to moisture that comes in contact with the granules, which granite constitutes approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

8. An insecticidal composition in granular form, suitable for use against flies and other insects, characterized by granules of particle size ranging from 3 to 100 screen mesh, inclusive, of granite as a carrier coated with a solution of O,O-dimethyl dithiophosphate of diethyl mercaptosuccinate in an oil and sugar in small particle size, which granite granules constitute approximately the entire solid carrier in the granular insecticide, and which oil is substantially non-volatile at atmospheric temperatures and relatively non-drying, the granular insecticide being relatively free of pulverulent particles, substantially free from clumping and readily pourable, and which granular insecticide is relatively dustless upon pouring from a container and under normal conditions of hand distribution.

9. An insecticidal composition in granular form characterized by granules of particle size ranging from 3 to 100 screen mesh, inclusive, of silica as a carrier coated with a mixture of an oil solution of an organic toxicant for the insect, and an organic attractant for the insect, which granular silica constitutes approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

10. An insecticidal composition in granular form, characterized by granules of particle size ranging from 3 to 100 screen mesh, inclusive, of silica as a carrier coated with a mixture of an oil solution of an organic toxicant for the insect, an organic attractant for the insect, and a dispersant for the toxicant-oil solution as to moisture that comes in contact with the granules, which silica constitutes approximately the entire solid carrier in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

11. An insecticidal composition in granular form, characterized by granules of oyster shell of particle size ranging from 3 to 100 screen mesh, inclusive, as a carrier and forming approximately the entire solid carrier, the major portion by weight of the particles of shell ranging within 10 to 20 screen mesh, and which granules of oyster shell are coated with a mixture of an oil solution of an organic toxicant for the insects and an organic attractant for the insects, which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

12. An insecticidal composition in granular form, characterized by granules of oyster shell of particle size ranging from 3 to 100 screen mesh, inclusive, as a carrier and forming approximately the entire solid carrier, the major portion by weight of the particles of shell ranging within 10 to 20 screen mesh, and which granules of oyster shell are coated with a mixture of an oil solution of an organic toxicant for the insects, an organic attractant for the insects, and a dispersant for the toxicant-oil solution as to moisture that comes in contact with the granules, which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

13. An insecticidal composition in granular form suitable for use against flies and other insects, characterized by granules of particles size ranging from 3 to 100 screen mesh, inclusive, of calcareous shell as a carrier coated with a mixture of a solution of O,O-dimethyl dithiophosphate of diethyl mercaptosuccinate in an oil, and sugar in small particle size, which granular calcareous shell constitutes not less than substantially two-thirds by weight of the entire carrier, and comprises the major component by weight in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

14. An insecticidal composition in granular form suitable for use against flies and other insects, characterized by granules of particle size ranging from 3 to 100 screen mesh, inclusive, of calcareous shell as a carrier coated with a mixture of a solution of O,O-dimethyl dithiophosphate of diethyl mercaptosuccinate in an oil, sugar in small particle size, and a dispersant for the toxicant-oil solution as to moisture that comes in contact with the granules, which granular calcareous shell constitutes not less than substantially two-thirds by weight of the entire carrier, and comprises the major component by weight in the granular insecticide, and which oil is substantially non-volatile at atmospheric temperatures and relatively non-drying, the said granular insecticide being relatively free of loose, unattached pulverulent particles, substantially free from clumping and readily pourable and is relatively dustless upon being poured from a container and under normal conditions of hand distribution.

15. An insecticidal composition in granular form, characterized by inorganic, non-porous, water-insoluble granules with particle size range from 3 to 100 screen mesh, inclusive, as a carrier coated with a concentrated aqueous solution of sorbitol containing at least ⅓ sorbitol by weight with the organic toxicant for the insect and an organic attractant for the insect, said sorbitol being in the proportion of approximately 0.5%–3% by weight of the total granular insecticide, which inorganic granules constitute not less than substantially two-thirds by weight in the granular insecticide, the said solution of sorbitol being employed in such quantity that the said granular insecticide is relatively free of loose, unattached pulverulent particles, substantially free from clumping and readily pourable, and is relatively dustless upon being poured from a container and under normal conditions of hand distribution.

16. An insecticidal composition in granular form, characterized by calcareous shell granules with particle size range from 3 to 100 screen mesh, inclusive, as a carrier coated with a concentrated aqueous solution of sorbitol containing at least ⅓ sorbitol by weight with an organic toxicant for the insect and an organic attractant for the insect, said sorbitol being in the proportion of approximately 0.5%–3% by weight of the total granular insecticide, which shell granules constitute not less than substantially two-thirds by weight in the granular insecticide, the said solution of sorbitol being employed in such quantity that the said granular insecticide is relatively free of loose, unattached pulverulent particles, substantially free from clumping and readily pourable, and is relatively dustless upon being poured from a container and under normal conditions of hand distribution.

17. The composition set out in claim 15 wherein the solution of sorbitol contains a thickening agent which is normally solid to confer body thereto.

18. The composition set out in claim 16 wherein the solution of sorbitol contains a thickening agent which is normally solid to confer body thereto.

19. An insecticidal composition in granular form, characterized by inorganic, non-porous, water-insoluble granules with particle size range from 3 to 100 screen mesh, inclusive, as a carrier coated with a solution of an organic toxicant in a vehicle which is a member of the group consisting of a non-volatile, relatively non-drying oil and a concentrated aqueous solution of sorbitol containing at least ⅓ sorbitol by weight, said sorbitol being in the proportion of approximately 0.5%–3% by weight of the total granular insecticide, and an organic attractant for the insect, which inorganic granules constitute not less than substantially two-thirds by weight in the granular insecticide, the respective coating liquids being employed in such quantity that the said granular insecticide is relatively free of loose, unattached pulverulent particles, substantially free from clumping and readily pourable, and is relatively dustless upon being poured from a container.

20. An insecticidal composition in granular form, characterized by granules of particle size ranging from 3 to 100 screen mesh, inclusive, of calcareous shell, as a carrier coated with a solution of an organic toxicant in a vehicle which is a member of the group consisting of a non-volatile, relatively non-drying oil and a concentrated aqueous solution of sorbitol containing at least ⅓ sorbitol by weight with an organic toxicant for the insect, said sorbitol being in the proportion of approximately 0.5–3% by weight of the weight of the total granular insecticide and an organic attractant for the insect, which calcareous shell granules constitute not less than substantially two-thirds by weight in the granular insecticide, the respective coating liquids being employed in such quantity that the said granular insecticide is relatively free of loose, unattached pulverulent particles, substantially free from clumping and readily pourable, and is relatively dustless upon being poured from a container and under normal conditions of hand distribution.

References Cited in the file of this patent

UNITED STATES PATENTS

| | | |
|---|---|---|
| 1,450,128 | Baker | Mar. 27, 1923 |
| 2,263,827 | Siegler | Nov. 25, 1941 |

FOREIGN PATENTS

| | | |
|---|---|---|
| 708,155 | Great Britain | Apr. 28, 1954 |